United States Patent [19]

Shelton

[11] 4,385,420
[45] May 31, 1983

[54] MACHINE FOR BULK TENDERIZING OPERATION

[75] Inventor: Charles L. Shelton, Garland, Tex.

[73] Assignee: Quik-To-Fix Products, Inc., Garland, Tex.

[21] Appl. No.: 239,579

[22] Filed: Mar. 2, 1981

Related U.S. Application Data

[63] Continuation-in-part of Ser. No. 152,662, May 23, 1980, Pat. No. 4,343,067.

[51] Int. Cl.³ .............................................. A22C 9/00
[52] U.S. Cl. ...................................................... 17/26
[58] Field of Search .............................. 17/25, 26, 27

[56] References Cited

U.S. PATENT DOCUMENTS

| | | | |
|---|---|---|---|
| 880,589 | 3/1908 | Snelling | 17/26 |
| 1,964,092 | 6/1934 | Spang | 17/26 |
| 2,279,071 | 4/1942 | Spang | 17/27 X |
| 2,564,651 | 8/1951 | Spang | 17/27 |
| 3,823,441 | 7/1974 | Bridge, Jr. | 17/26 |

Primary Examiner—Willie G. Abercrombie
Attorney, Agent, or Firm—Hubbard, Thurman, Turner & Tucker

[57] ABSTRACT

A bulk processing meat cutlet tenderizing machine is provided with multiple sets of roller cutters between which a meat cutlet is tenderized. The roller cutters of each set are arranged in parallel pairs with rotary tenderizing knives mounted on each roller cutter. The second set of roller cutters are vertically spaced with respect to the roller cutters of the first set to permit a meat cutlet to be engaged and perforated simultaneously by the rotary knives of both first and second sets as the meat cutlet advances through the roller cutter pairs. The cutlets are inverted automatically after passing through a first array of roller cutters. The cutlets then undergo further perforation and enlargement in successive cutter stations. The direction of feeding movement to the successive cutter stations is at a right angle with respect to the direction of feeding movement in the first cutter station, with the result that each cutlet is tenderized on its opposite faces along lines which are mutually perpendicular, thereby assuring maximum tenderizing effect.

1 Claim, 6 Drawing Figures

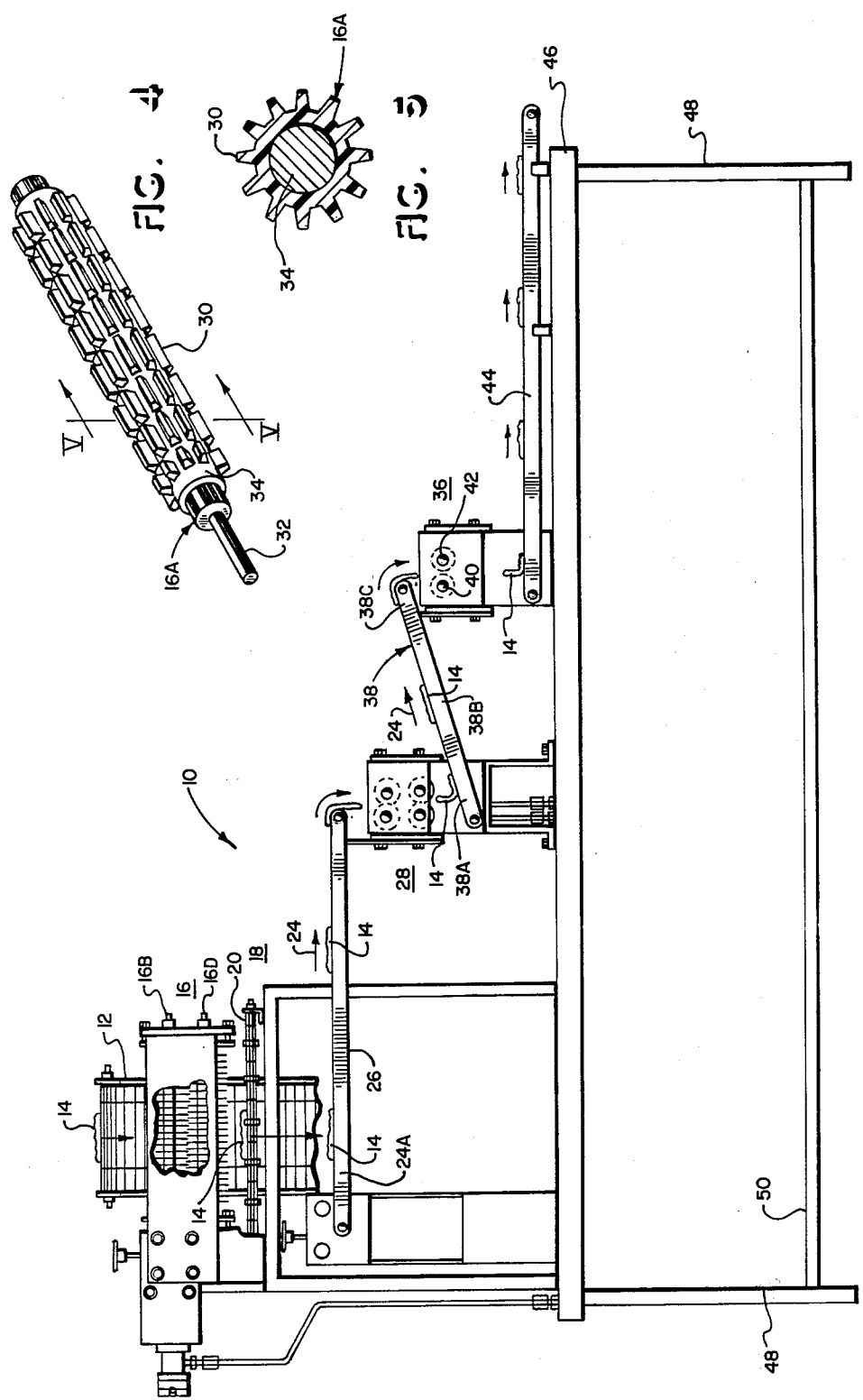

MACHINE FOR BULK TENDERIZING OPERATION

CROSS-REFERENCE TO RELATED APPLICATION

This application is a continuation-in-part of co-pending U.S. application Ser. No. 152,662, filed May 23, 1980, by Charles L. Shelton now U.S. Pat. No. 4,343,067, filed Aug. 10, 1982.

BACKGROUND OF THE INVENTION

1. Field of the Invention

This invention relates to food processing apparatus and in particular to a meat tenderizing machine having roller cutters for tenderizing meat cutlets.

2. Description of the Prior Art

Breaded veal and steak cutlets of the type typically served in restaurants comprise meat cutlets which have undergone tenderizing and breading operations prior to cooking. The tenderizing and breading may be carried out on the premises of the restaurant but in most establishments bulk quantities of the breaded cutlets are provided by a food processing vendor according to certain specifications regarding meat portion size, weight and breading constituency.

According to conventional methods, the tenderizing process is carried out by a single operator on a tenderizing machine which has a pair of roller cutters provided with teeth or knives for severing the connective tissues and striations. The meat cutlet is fed between the roller cutters, and after discharge from the cutters, is manually inverted and rotated 90° by the operator and is fed through the roller cutters again. This procedure may be repeated to achieve the desired degree of tenderizing. This manual operation is quite slow and requires the close attention of an operator during the inverting and turning steps. The effectiveness of bulk tenderizing operations involving multiple operators and multiple tenderizing units has been limited by the increasing capital expenditures for individually operated tenderizing machines and by rapidly increasing labor costs. Although a single meat tenderizing machine and operator may be economically competitive in a low volume operation, food processing vendors who supply bulk quantities of tenderized cutlets require automatic tenderizing equipment capable of high volume production with minimum supervision and maintenance.

Because of the tendency of the cutlet to shrink during cooking, it is desirable during the tenderizing procedure to flatten out the cutlet and increase its surface area as much as possible prior to performing the breading step. According to conventional methods, the cutlet is pressed and squeezed as it is fed through closely spaced rollers to obtain the desired increase in surface area. This is usually carried out by successive squeezing and pressing operations in separate roller presses which increases the processing time and in some cases limits the rate at which cutlets can be fed through the roller cutters.

Therefore, there is a continuing interest in providing apparatus which is capable of efficient bulk processing of meat cutlets in which the tenderizing and surface area expansion procedures are carried out effectively and efficiently.

OBJECTS OF THE INVENTION

It is therefore a principal object of the present invention to provide apparatus which is capable of processing bulk quantities of meat cutlets effectively and efficiently by simultaneously perforating and stretching each meat cutlet to sever connective tissue and to increase the surface area of the cutlet automatically in a single operation.

A further object of the invention is to provide a meat tenderizing machine which is capable of simultaneously tenderizing a meat cutlet on opposite faces in a first direction, inverting the cutlet and thereafter tenderizing the meat cutlet on opposite faces in parallel lines which extend transversely with respect to the tenderizing lines of the first operation.

It is yet another object of the present invention to provide an improved meat tenderizing machine which may be quickly and easily dismantled and having all parts easily accessible to permit steam cleaning and maintenance operations to be carried out expediently.

SUMMARY OF THE INVENTION

In accordance with the principles of the present invention, a meat tenderizing machine which achieves the foregoing objects is characterized by a vertically stacked array of pairs of rollers having radially projecting tenderizing elements for engagement with opposite faces of a meat cutlet with the roller pairs being disposed in spaced relation to each other permitting the meat cutlet to be engaged simultaneously by the tenderizing elements of adjacent pairs of coacting roller cutters. Drive means are coupled to the rollers for simultaneously rotating the rollers of each cutter pair, and conveyor means are provided for moving the cutlets from station to station.

According to an important feature of the invention, tenderizing of a meat cutlet is carried out by perforating the cutlet at spaced intervals along parallel lines on opposite faces of the cutlet as it advances through a first processing station, and inverting the cutlet prior to feeding it through a second processing station where it is tenderized by penetrating the cutlet at spaced intervals along parallel lines which extend transversely with respect to the perforations formed at the first processing station. In a preferred embodiment, the cutlet is enlarged and perforated in a first direction by passing the cutlet through first and second sets of roller cutters, and then enlarged and perforated in a second direction transverse to the first direction by passing the cutlet through successive roller cutter stations.

The foregoing and other objects, advantages and features of the invention will hereinafter appear, and for purposes of illustration, but not of limitation, an exemplary embodiment of the subject invention is shown in the appended drawings.

BRIEF DESCRIPTION OF THE DRAWINGS

FIG. 3 is a rear elevation view of the meat tenderizing machine shown in FIG. 1;

FIG. 4 is a perspective view of a roller cutter;

FIG. 5 is a sectional view taken along the lines V—V of the roller cutter of FIG. 4; and, FIG. 6 is an elevation view of an inverting station on the meat tenderizing machine of FIG. 1.

DETAILED DESCRIPTION OF THE PREFERRED EMBODIMENT

Figure 1:
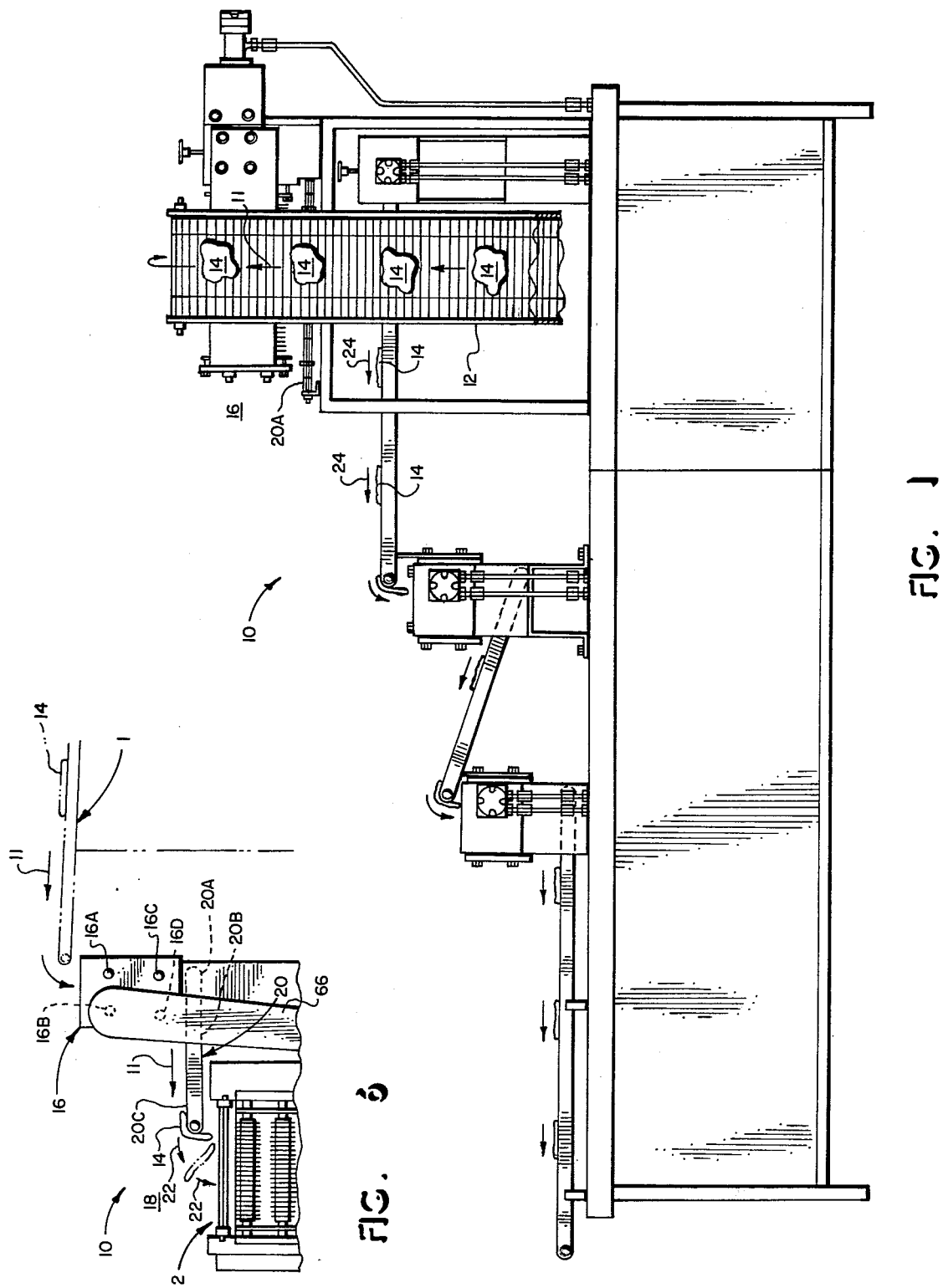
FIG. 1 is a side elevation view of a meat tenderizing machine constructed according to the teachings of the present invention which is capable of processing bulk quantities of meat cutlets.

In the description which follows, like parts are marked throughout the specification and the various drawing figures with the same reference numerals, respectively. The drawing figures are not necessarily to scale and in some instances portions have been exaggerated in order to more clearly depict certain features of the invention.

Figure 2:
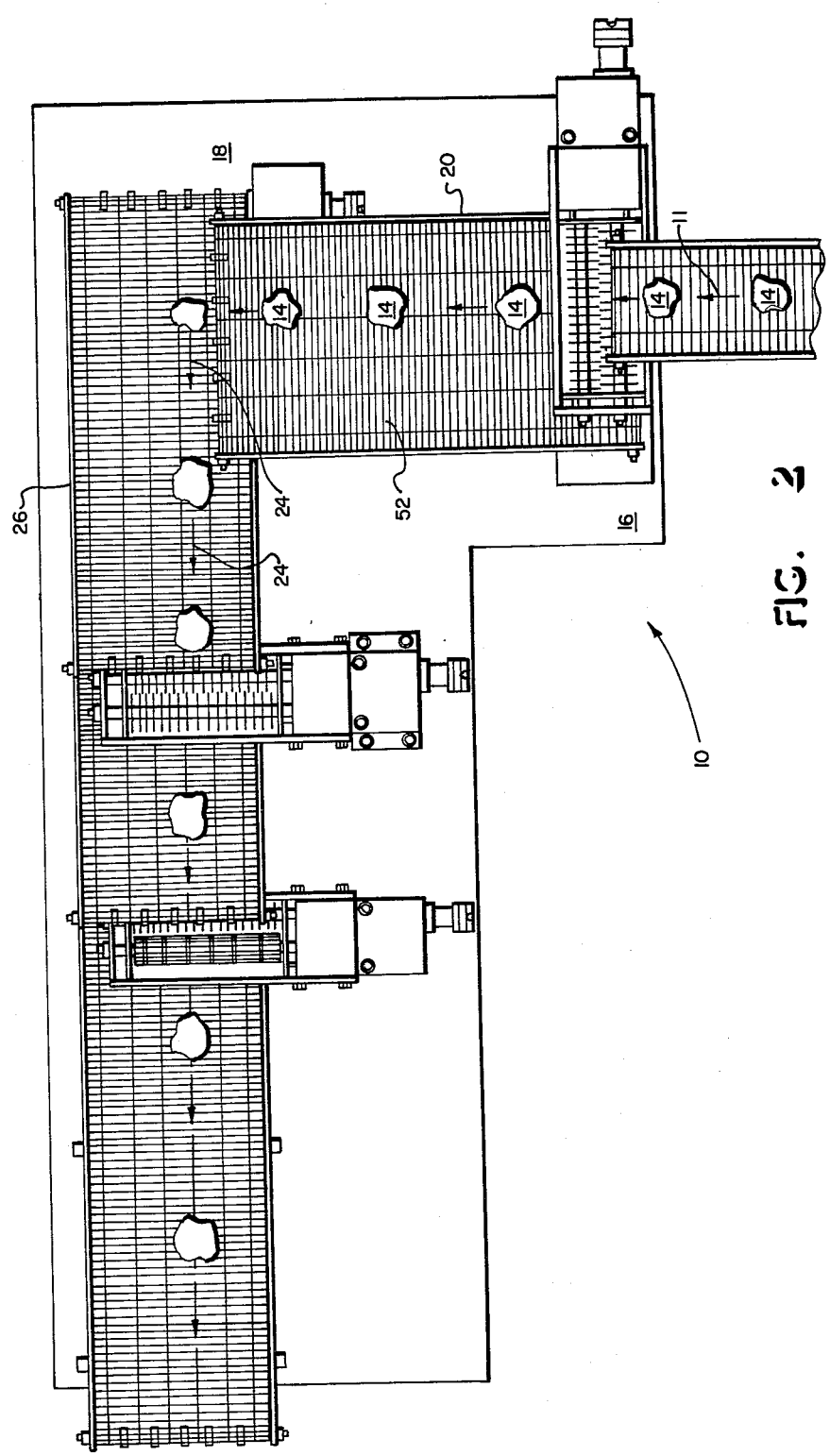
FIG. 2 is a plan view of the meat tenderizing machine shown in FIG. 1.

Referring now to the drawing, and in particular to FIGS. 1, 2 and 3 thereof, a meat tenderizing machine 10 incorporating the principles of the invention is organized in a series of processing stations which are linked together by continuous conveyor belts. As can best be seen in FIGS. 2 and 3, the meat tenderizing machine 10 includes a loading station (not shown) which may be, for example, an upstanding table placed adjacent a first conveyor 12 in any convenient arrangement which will permit bulk quantities of meat cutlets 14 to be manually or automatically loaded onto the conveyor 12 for transportation and delivery to a first tenderizing station 16 along a first direction of feeding movement 11.

After being tenderized in the first tenderizing station 16, the meat cutlets 14 are transported to an inverting station 18 by a second conveyor 20. The second conveyor 20 has a loading end 20A disposed below and adjacent the first tenderizing station 16 for receiving the meat cutlets 14 as they are discharged therefrom, an intermediate transporting section 20B and a delivery end 30C for transporting the meat cutlets 14 in the first direction of feeding movement as indicated by the arrows 22. After undergoing inversion, the meat cutlets 14 are conveyed along a second direction of feeding movement as indicated by the arrows 24 on a third conveyor 26 which is oriented transversely with respect to the first and second conveyors, preferably by 90°. The third conveyor assembly 26 has a loading end 24A disposed in the inverting station 18 at a lower elevation relative to the delivery end 20C of the second conveyor assembly 20 to permit free fall and rotational inversion of the cutlet 14 so that it is delivered in an upside down position onto the third conveyor assembly 26. After undergoing inversion, the cutlets 14 are transported to a second tenderizing station 28.

According to a preferred embodiment of the invention, the tenderizing stations 16, 28 include a vertically stacked array of pairs of roller cutters 16A, 16B, 16C, 16D and 28A, 28B, 28C, 28D, respectively. The roller cutters are identically constructed according to a typical arrangement as shown in FIG. 4. Each roller cutter, for example the roller cutter 16A, includes a plurality of knife tips 30 secured to a roller shaft 32 by means of a retainer ring and spacer assembly 34.

The tenderizing cutter tips 30 project radially with respect to the roller shaft 32 for engagement with opposite faces of the meat cutlet 14 so that each meat cutlet is severed along spaced parallel perforations by the knife tips 30 as it passes through the coacting rollers. Since the cutter teeth 30 are disposed in parallel relation with the direction of first feeding movement II, it will be seen that the cutlets are tenderized and perforated at spaced intervals along lines which are parallel with respect to the first direction of feeding movement II.

The cutlets 14 are inverted in the inverting station 18 so that as they pass through the second tenderizing station 26, they undergo perforation and tenderizing along spaced lines which are parallel with the second direction 24 of feeding movement. Since the second direction 24 of feeding movement is substantially at right angles with respect to the first direction II of feeding movement, the cutlet is tenderized on its opposite faces along two sets of parallel lines which are relatively transverse, and preferably mutually perpendicular, thereby assuring maximum tenderizing effect.

After being discharged from the second tenderizing station 28, the cutlets are transported to a spreader station 36 by means of a fourth conveyor assembly 38 having a loading end 38A disposed below the coacting roller cutters of the second tenderizing station 26, an intermediate transporting section 38B and a delivery end 38C for discharging cutlets into the spreader station 36. The spreader station 36 includes a pair of coacting spreader rollers 40, 42 which are closely spaced to squeeze and spread each cutlet to increase its surface area. The rollers 40, 52 preferably comprise nylon cylinders. After undergoing spreading, the cutlets are transported over a fifth conveyor assembly 44 to a breading station (not illustrated) where they undergo breading according to conventional procedures.

Referring again to FIG. 3, the processing stations and conveyors are disposed at different elevations in a right angle arrangement which provides inversion of each meat cutlet in the inverting station 18. Inversion of each cutlet permits visual inspection of both sides of each meat cutlet for quality control.

In FIGS. 1, 2 and 3, the processing stations and conveyors are shown mounted on a work table 46 which is supported by upstanding support legs 48. The work table 46 preferably includes an intermediate support shelf 50 on which electrical and hydraulic power equipment are located. The conveyor assemblies can be of any desired type capable of sterilization but preferably are of the well known link construction having a plurality of transverse panel segments 52 connected on pivots or hinges to provide flexibility.

Therefore, it will be apparent that the meat tenderizing machine of the present invention provides substantial advantages over conventional tenderizing apparatus and is designed to speed up the tenderizing and processing of bulk quantities of meat cutlets. The meat tenderizing apparatus of the present invention requires a minimum amount of floor space, produces high quality, uniformly tenderized cutlets and facilitates rapid maintenance and sterilizing. Additionally, the entire system provides an improved method of bulk food processing that increases output, reduces the requirement for extensive operator training, reduces operator labor and improves produce quality.

Although a preferred embodiment of the invention has been described in detail, it should be understood that various changes, substitutions and alterations can be made therein without departing from the spirit and scope of the invention as defined by the appended claims.

What is claimed is:

1. Meat tenderizing apparatus comprising, in combination:
   a loading station;
   a first processing station;
   a first conveyor assembly having a loading end, an intermediate transporting section and a delivery end for transporting meat cutlets in a first direction of feeding movement from said loading station to said first processing station;

a first array of roller cutter pairs disposed below and adjacent the first conveyor assembly in the first processing station and extending across the delivery end of the first conveyor assembly for receiving cutlets, said roller cutter pairs having radially projecting tenderizing elements for engaging opposite faces of the cutlet and tenderizing the cutlet along parallel lines;

an inverting station;

a second conveyor assembly having a loading end disposed below and adjacent said first array of coacting rollers for receiving cutlets as they are discharged from said coacting rollers, an intermediate transporting section and a delivery end for transporting cutlets in said first direction of feeding movement to the inverting station;

a second processing station;

a third conveyor assembly extending in a second direction of feeding movement transversely with respect to the first direction of feeding movement, said third conveyor having a loading end, a delivery end and an intermediate section for transporting cutlets from the inverting station to said second processing station, the loading end of said third conveyor assembly being disposed in the inverting station at a lower elevation relative to the delivery end of the second conveyor assembly to permit free fall and rotational inversion of said cutlet so that it is delivered in upside down position onto said third conveyor assembly;

a second array of coacting rollers disposed below and adjacent the third conveyor assembly in the second processing station and extending across the delivery end of the third conveyor assembly for receiving the inverted cutlets, said coacting rollers having radially projecting tenderizing elements for engaging opposite faces of the inverted cutlets and tenderizing the cutlets along parallel lines which extend transversely with respect to the parallel tenderizing lines produced in the first processing station;

a delivery station; and, a fourth conveyor assembly having a loading end disposed below the coacting rollers of the second array for receiving the cutlets as they are discharged from said coacting rollers, an intermediate transporting section and a delivery end for transporting cutlets in said second direction of feeding movement to the delivery station.

* * * * *